United States Patent
Lu et al.

(10) Patent No.: US 9,052,102 B2
(45) Date of Patent: Jun. 9, 2015

(54) ELECTRICAL INTERCONNECT SYSTEM FOR THIN BODY STRUCTURES

(71) Applicant: ABL IP Holding, LLC, Conyers, GA (US)

(72) Inventors: Min-Hao Michael Lu, Castro Valley, CA (US); Michael Trung Tran, Oakland, CA (US)

(73) Assignee: ABL IP Holding, LLC, Conyers, GA (US)

( * ) Notice: Subject to any disclaimer, the term of this patent is extended or adjusted under 35 U.S.C. 154(b) by 0 days.

(21) Appl. No.: 13/710,332

(22) Filed: Dec. 10, 2012

(65) Prior Publication Data

US 2013/0147398 A1 Jun. 13, 2013

Related U.S. Application Data

(60) Provisional application No. 61/568,981, filed on Dec. 9, 2011.

(51) Int. Cl.
| | |
|---|---|
| *H05B 37/00* | (2006.01) |
| *H05B 41/00* | (2006.01) |
| *H05B 39/00* | (2006.01) |
| *F21V 23/06* | (2006.01) |
| *F21Y 105/00* | (2006.01) |

(52) U.S. Cl.
CPC ........... *F21V 23/06* (2013.01); *F21Y 2105/008* (2013.01); *H01L 2251/5361* (2013.01); *Y02B 20/36* (2013.01)

(58) Field of Classification Search
USPC ...................... 315/315, 307, 291; 362/249.01
See application file for complete search history.

(56) References Cited

U.S. PATENT DOCUMENTS

| | | | | |
|---|---|---|---|---|
| 3,621,321 A | * | 11/1971 | Williams et al. | 313/504 |
| 2004/0022058 A1 | * | 2/2004 | Birrell | 362/249 |
| 2008/0030975 A1 | * | 2/2008 | Miyashita et al. | 362/26 |
| 2011/0273886 A1 | * | 11/2011 | Lu et al. | 362/249.02 |
| 2012/0169226 A1 | * | 7/2012 | Huang et al. | 315/32 |
| 2013/0278158 A1 | * | 10/2013 | Kim et al. | 315/192 |

* cited by examiner

*Primary Examiner* — Dylan White
(74) *Attorney, Agent, or Firm* — Beeson Skinner Beverly, LLP

(57) ABSTRACT

An electrical interconnect system is comprised of at least one and suitably a plurality of thin body light sources, such as OLED panels, to be electrified. The thin body light source or sources have a thin profile and include a back side provided with surface contact electrodes for energizing the thin body light sources, which can be relatively large area electrodes for providing a relatively large contact surface area. A connector circuit supported by a thin body support structure is provided for making desired electrical connections between thin body light sources or to a voltage or current source when the thin body support structure is brought into engagement with the thin body light sources.

15 Claims, 10 Drawing Sheets

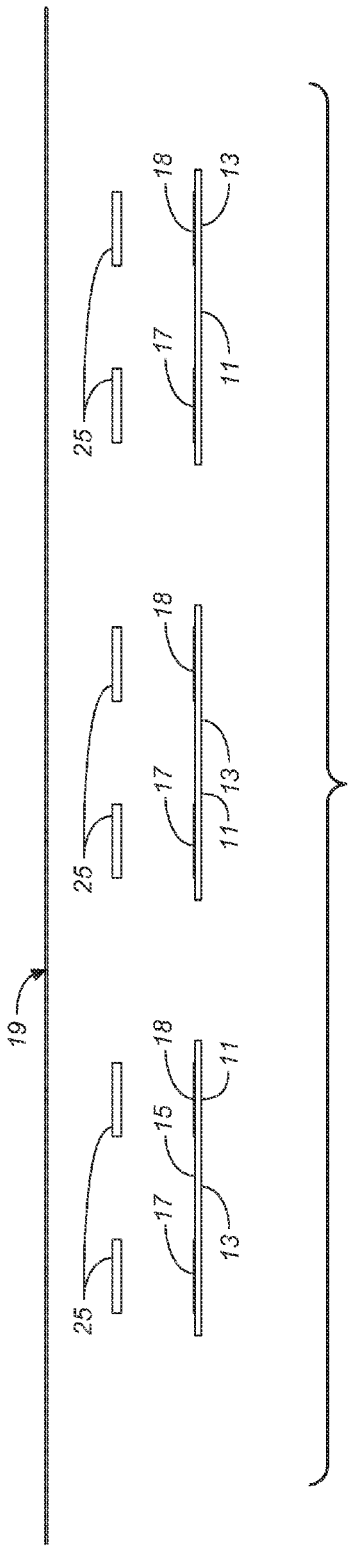
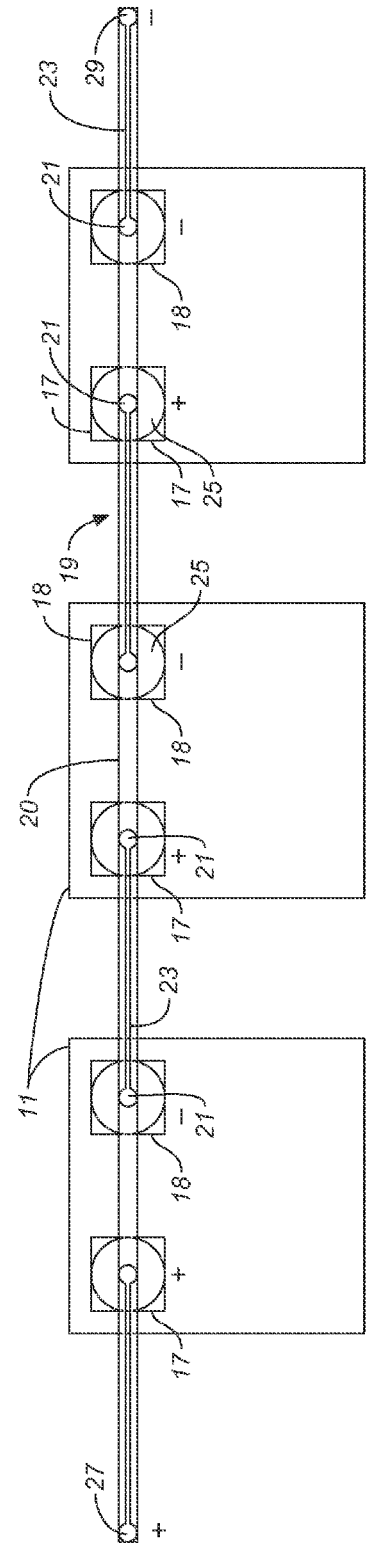
FIG. 2
FIG. 3

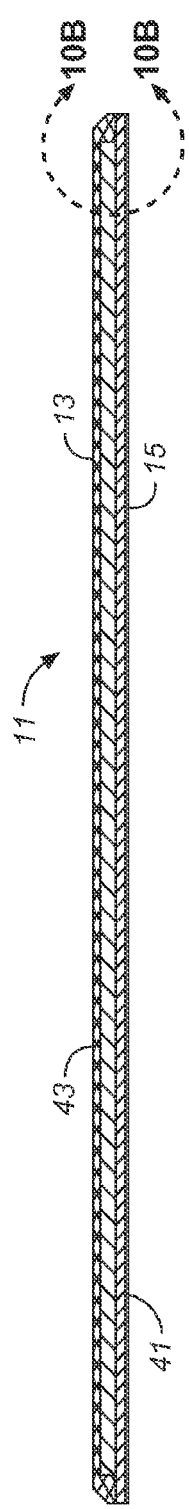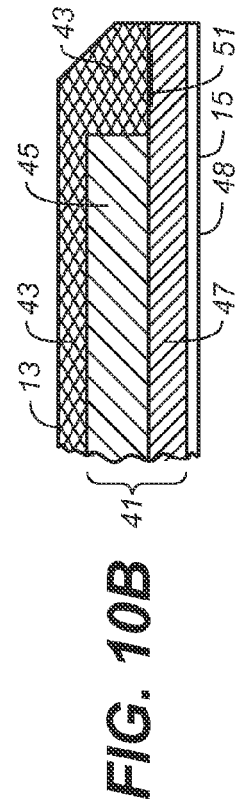
FIG. 10A
FIG. 10B

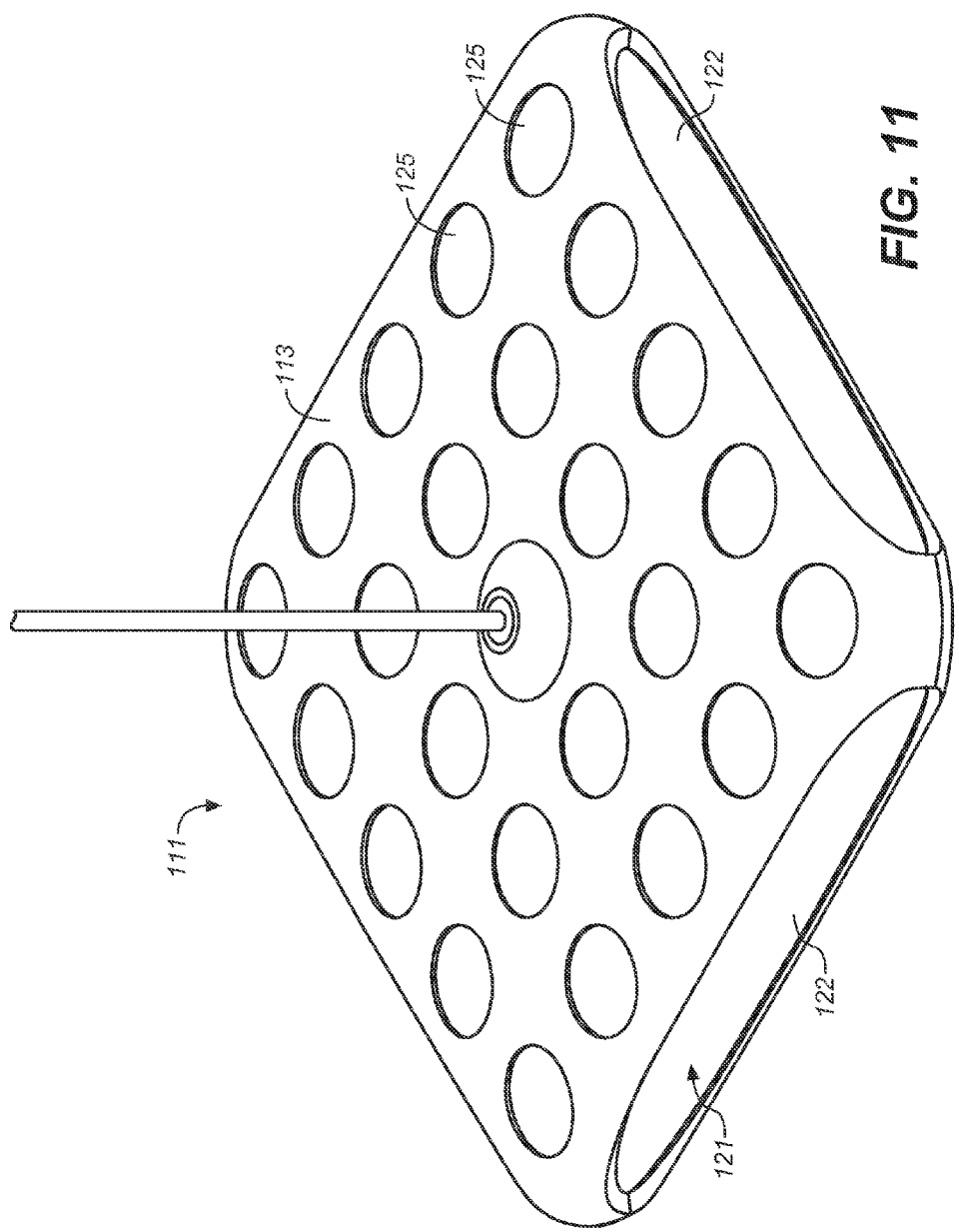

ELECTRICAL INTERCONNECT SYSTEM FOR THIN BODY STRUCTURES

CROSS-REFERENCE TO RELATED APPLICATIONS

This application claims the benefit of U.S. Provisional Application No. 61/568,981, which is incorporated herein by reference.

BACKGROUND OF THE INVENTION

The present invention generally relates to thin body structures that need to be electrically interconnected, and more particularly relates to luminaires employing thin body light sources, such as OLED panels, to which electrical connections need to be established in confined spaces.

The emergence of thin body light sources as an alternative light source for luminaires has created challenges for designers in providing easy-to-make and efficient electrical connections between the thin body sources and to a power source. This is particularly true if the thin body sources are mounted in thin body support structures having limited space for commonly used electrical wires and wire connectors. Not only is it difficult to provide for wire paths through the thin body support structures and to provide for suitable locations for the wire connectors, the connections themselves are difficult to make because of the small part sizes and confined spaces involved.

The present invention provides for an electrical interconnect system for thin body structures that can be readily accommodated within the thin profiles of the structures. The invention greatly facilitates the establishment of efficient electrical connections within and between thin body structures, and eliminates the need for conventional wire connectors that can be relatively bulky in comparison to the thickness of thin body structures and that can be difficult to locate on the structures.

The invention has particular application in thin body luminaires that employ planar light sources that must be connected within the source's thin body support structure. For example, an OLED luminaire may have a plurality of OLED panels supported in surrounding structures with no appreciable thickness in which to provide wire channels and wire connectors. Moreover, the surrounding structure may be partially or completely transparent, making it difficult to hide the wires and connectors from view. The present invention overcomes these drawbacks by providing an electrical interconnect system that is unobtrusive and easily implemented within the thin profiles of a thin body OLED luminaire.

SUMMARY OF THE INVENTION

Briefly, the present invention is an electrical interconnect system comprised of at least one and suitably a plurality of thin body light sources, such as OLED panels, to be electrified. The thin body light source or sources have a thin profile and include a front side for emitting light, and a back side provided with surface contact electrodes for energizing the thin body light sources. Preferably, the surface contact electrodes are relatively large area electrodes for providing a relatively large contact surface area. A connector circuit supported by a thin body support structure is provided for making desired electrical connections between thin body light sources or to a voltage or current source. The connector circuit has conductive contact terminals for contacting the surface contact electrodes of the thin body light sources. Conductor paths electrically connect selected contact terminals to complete the connector circuit. The conductor paths can be applied to or embedded in the thin body support structure for the connector circuit.

The thin body support structure that supports the connector circuit is adapted to engage the back side of the thin body light source or sources. The contact terminals of the connector circuit are positioned so as to align with selected electrodes of the thin body light source or sources when the thin body support structure and thin body light source or sources are engaged. Resilient electrical contacts associated with each of the contact terminals of the thin body support structure provide a resilient electrical contact between the contact terminals of the connector circuit and the electrodes of the thin body light source or sources when the thin body support structure for the connector circuit and the thin body light sources are operatively engaged. The connector circuit of the thin body support structure is configured to establish desired electrical connections between thin body light sources and/or between a thin body light source or sources and a voltage or current source upon such engagement.

For example, the connector circuit supported in or on a thin body support structure can be configured to automatically establish a desired series connection between OLED panels and one or more external current sources (drivers) for the OLED panels when OLED panels are installed in a thin body luminaire. This eliminates the need to make wire connections after installation of the OLED panels. Also, by embedding the OLED panel connector circuit in or on a thin body support structure of the luminaire, the use of loose wires that are difficult to accommodate in thin body luminaires can be minimized or eliminated.

In accordance with one illustrated embodiment of the invention, the connector circuit can be provided by a flexible circuit comprised of conductor traces connecting its contact terminals. The conductor traces can be applied to any thin body structure of a luminaire, such as a thin wall to which the thin body light sources are mounted, or to a cover plate placed over the back of the thin body light sources, and can be "flexible" in the sense that it can conform to the shape of the thin body structure. Resilient electrical contacts can be interposed between the contact terminals of the connector circuit and the electrodes of the thin body light sources for establishing efficient electrical contacts. The resilient electrical contacts are suitably in the form of resilient conductor pads, such as conductive silicone pads, and provide for an efficient electrical contact between the thin body light sources of the luminaire and the connector circuit for the light sources when the light sources and thin body connector circuit containing part of the luminaire are engaged.

In accordance with another illustrated embodiment of the invention, the connector circuit can be provided by spring contacts on a rigid thin body support structure that supports the connector circuit. In this embodiment, the spring contacts on the thin body structure provide the resilient electrical contacts with the thin body light source or sources. The spring contacts are part of a connector circuit provided on or embedded in the thin body support structure.

It will be appreciated that other implementations of the present invention are possible other than the embodiments described and illustrated herein. It will also be understood that the thin body light sources and thin body support structures described herein need not be flat structures, but could lie in curved planes.

BRIEF DESCRIPTION OF THE DRAWINGS

FIG. 2 is a side elevational view thereof.

FIG. 3 is top plan view thereof.

FIG. 10A is an enlarged cross-sectional view thereof.

FIG. 10B is a further enlarged fragmentary cross-sectional view thereof.

FIG. 11 is a top perspective view of an exemplary luminaire having thin body OLED panels as light sources and thin body support structures for connector circuits configured to establish desired electrical connections between OLED panels of the luminaire.

DETAILED DESCRIPTION OF THE ILLUSTRATED EMBODIMENTS

Figure 1:
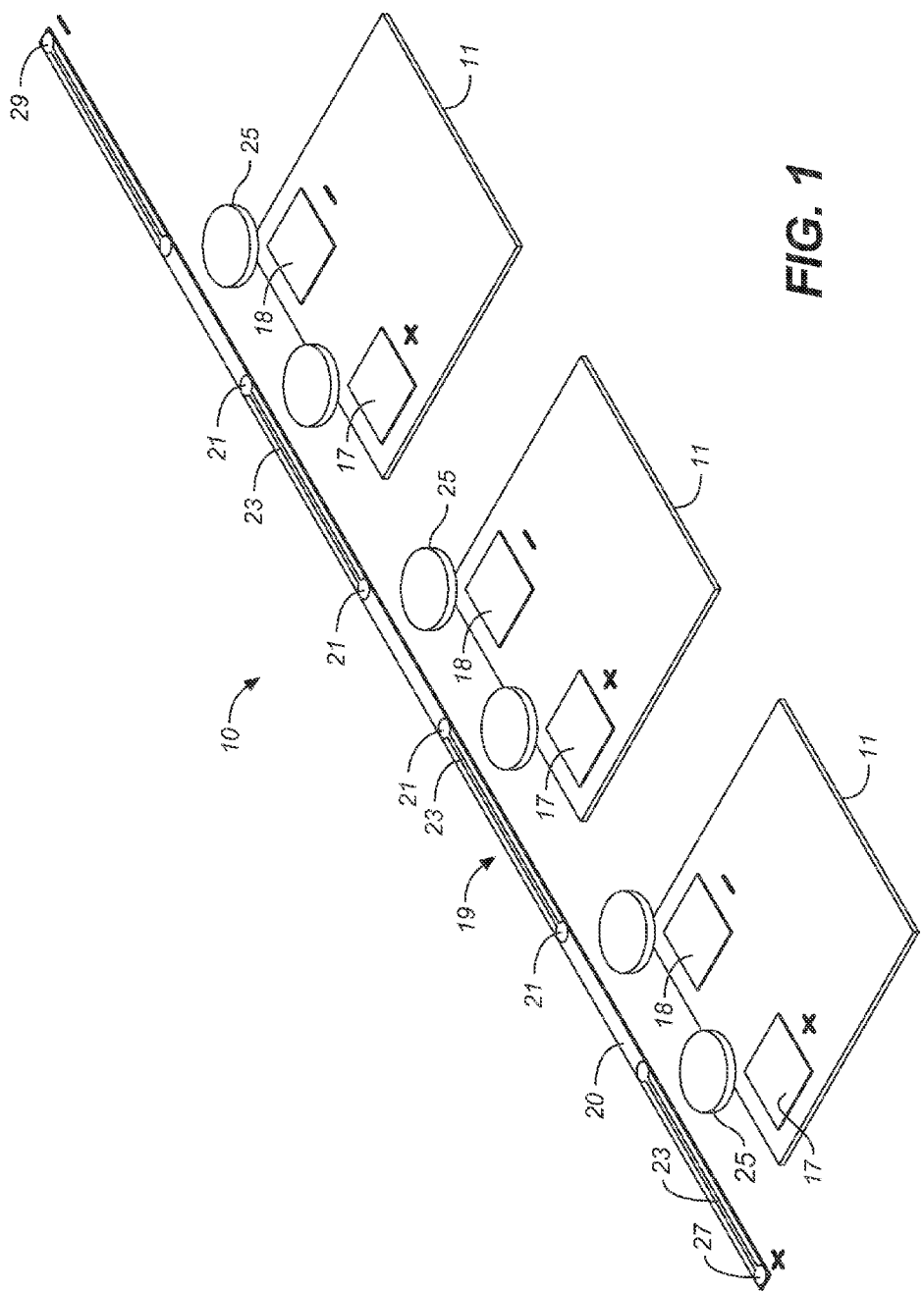
FIG. 1 is a graphical top perspective view of a first embodiment of an electrical interconnect system in accordance with the invention.

Turning now to the drawings, FIGS. 1-3 depict one embodiment of an electrical interconnect system in accordance with the invention. The electrical interconnect system, generally denoted by the numeral 10, is shown as interconnecting three thin body light sources, such as OLED panels 11, each of which has a light emitting front side 13 and back side 15. The back side of each OLED panel is provided with side-by-side positive and negative surface contact electrodes 17, 18, which are suitably large-area planar electrodes for providing relatively large electrical contact surfaces. A connector circuit 19 for the OLED panels is provided, which makes contact with the surface contact electrodes 17, 18 of OLED panels 11 when the connector circuit and OLED panels are engaged. The connector circuit can be a thin, flexible circuit element supported by and conforming to the shape of a thin body support structure of a luminaire which the OLED panels engage when installed or which are caused to engage the OLED panels after the OLED panels are installed. In FIGS. 1-3, the thin body support structure which holds the connector circuit is graphically represented by a simple thin strip 20. However, as illustrated in the example of a luminaire described later below, the thin body structure can be any thin structural element capable of being contacted by or brought into contact with the back side of the OLED panels, such as by a cover plate having circuit traces on the surface of the plate facing the OLED panels. The flexible circuit traces can be made to conform to surfaces of different shapes and contours according as required by particular applications.

With further reference to FIGS. 1-3, the connector circuit 19 is seen to include a series of surface contact terminals 21 and conductor traces 23 on the thin body structure 20. The conductor traces interconnect adjacent surface contact terminals on the thin body structure, and the thin body structure is positioned over the back side of the OLED panels 11 so as to align the contact terminals with the positive and negative electrodes 17, 18 of the OLED panels. It is noted that, in FIGS. 1 and 3, the contact terminals and conductor traces are shown on the top of the thin body structure 20 for illustrative purposes only. These circuit elements would in practice be on the underside of the thin body structure facing the back side of the OLED panels.

In the configuration of the connector circuit illustrated in FIGS. 1-3, the connector circuit electrically connects the OLED panels in series by connecting the negative surface contact electrode of one OLED panel to the positive surface contact electrode of the adjacent OLED panel. The end OLED panels are in turn connected to the positive and negative leads 27, 29 of the connector circuit that can connect to a current source (not shown).

When the OLED panels are engaged with the connector circuit of the interconnect system, it is important that an efficient electrical connection be established between the connector circuit and the OLED panels, one with low contact resistance. An inefficient contact caused, for example, by a slight misalignment of thin body parts due to manufacturing tolerances can lead to excessive power loss across the contacts or a failure to establish an electrical contact. To overcome this problem, resilient electrical contacts are provided between the OLED panels 11 and the connector circuit 19. In the embodiment shown in FIGS. 1-3, these resilient contacts are made by means of resilient conductor pads 25, which are interposed between the OLED electrodes 17, 18 and the connector circuit contact terminals 21. When the connector circuit is operatively engaged with the OLED panels, the resilient conductor pads will be compressed between the OLED panel electrodes and contact terminals of the connector circuit to produce a firm electrical contact. With such resilient contacts, manufacturing tolerances can be accounted for and an efficient electrical connection made between the thin body structures that need to be electrically interconnected.

The resilient conductor pads 25 can suitably be silicone conductor pads and can be held in position between the OLED panel electrodes and contact terminals of the connector circuit by any suitable means, such as by affixing the conductor pads to the OLED panel electrodes or to the connector circuit contact terminals.

Figure 4:
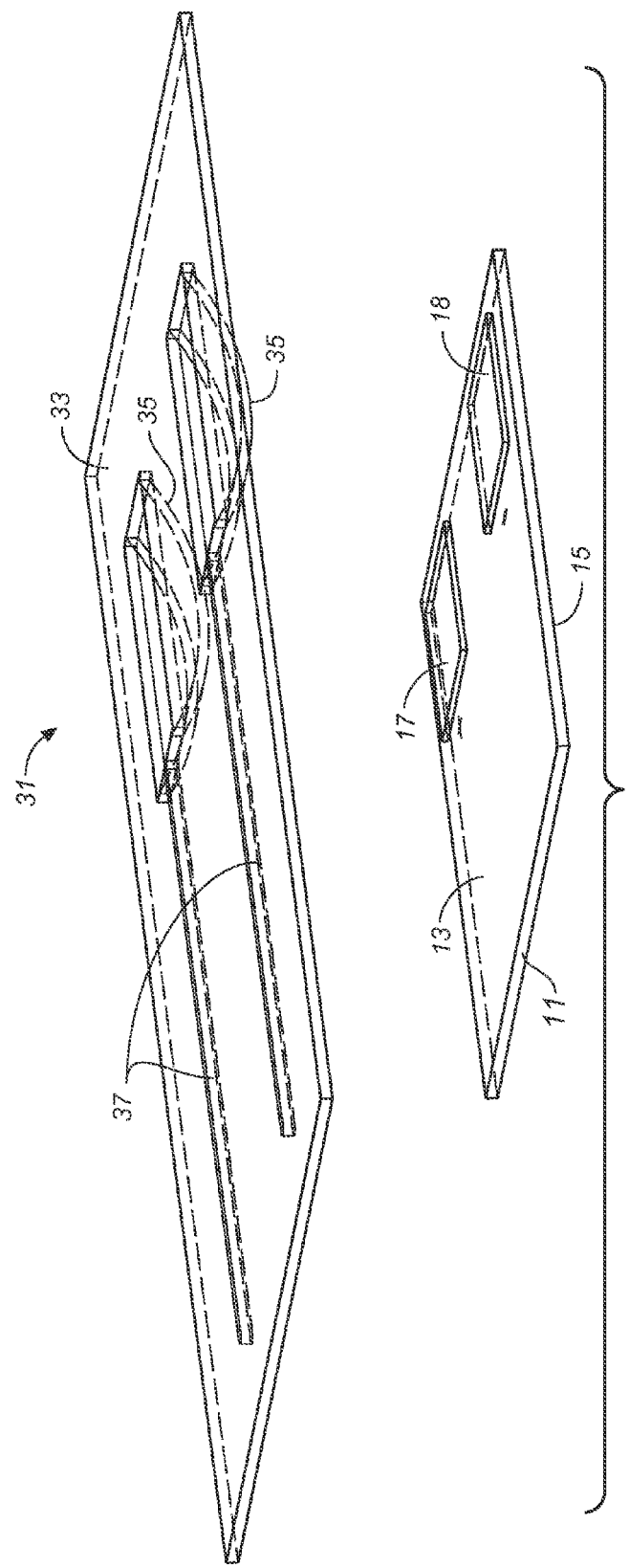
FIG. 4 is a graphical top perspective view of a second embodiment of an electrical interconnect system in accordance with the invention.
Figure 5:
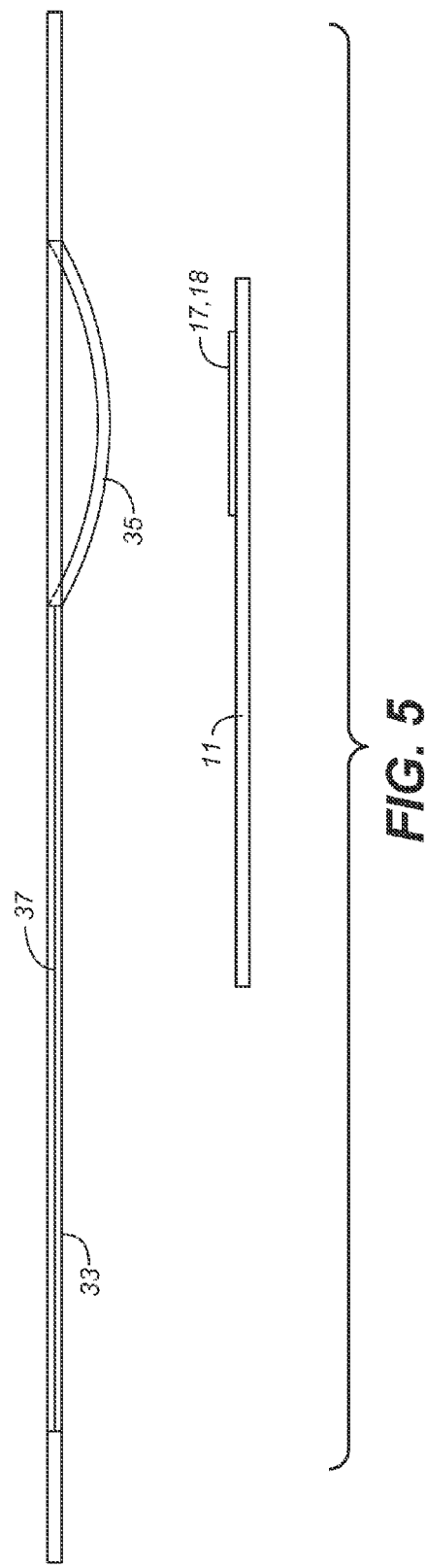
FIG. 5 is a side elevational view thereof.
Figure 6:
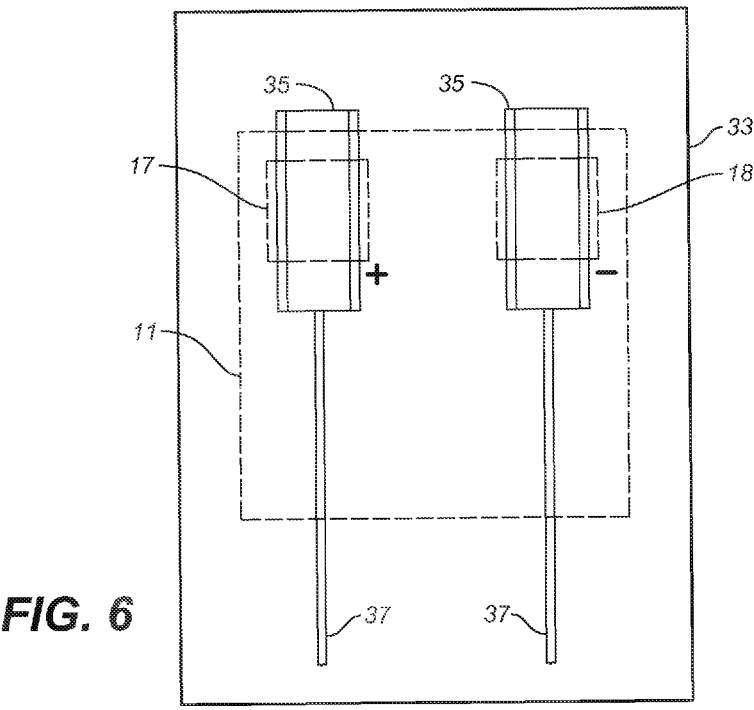
FIG. 6 is top plan view thereof.

FIGS. 4-6 depict another embodiment of an electrical interconnect system in accordance with the invention (generally denoted by the numeral 31), wherein the resilient contacts with the electrodes 17, 18 of the OLED panel are made by spring contacts instead of by resilient conductor pads. In FIGS. 4-6, a single OLED panel 11 having a positive and negative electrode is shown juxtaposed beneath a rigid thin body structure 33 containing leaf spring contacts 35 that project slightly below the bottom of the thin body structure. The spring contacts are positioned on the thin body structure 33 so as to align with the OLED's surface contact electrodes, and resiliently depress against the electrodes when the OLED panel is engaged with the thin body structure containing the spring contacts. Such a resilient contact produces an efficient electrical connection with the OLED upon engagement of the OLED panel and thin body structure.

The thin body structure 33 containing the spring contacts 35 is also seen to contain conductor paths for the connector circuit of the electrical interconnect system. In FIGS. 4-6 these conductor paths are shown in part as conductor paths 37. Conductor paths 37 could be conductor traces on the thin body structure 33 or conductors, such as wires, on or embedded in the thin wall structure.

Figure 7:
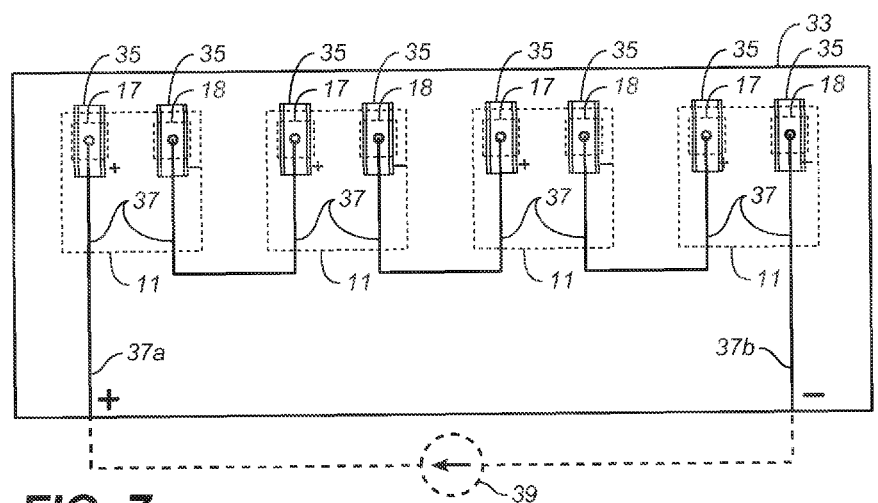
FIG. 7 is a depiction of four OLED panels electrically connected in series using an electrical interconnect system such as shown in FIGS. 4-6.

FIG. 7 shows a thin wall structure 33 containing multiple spring contacts 35 such as described above and shown in FIGS. 4-6 juxtaposed over multiple thin body OLED panels 11 having positive and negative electrodes 17, 18. FIG. 7 more specifically illustrates a connector circuit supported by thin body structure 33 that connects the OLED panels in a series connection with current source 39. The connector circuit includes the spring contacts 35 and conductor paths 37. The series circuit connects to the current source 39 by means of positive and negative leads 37a and 37b.

Figure 8:
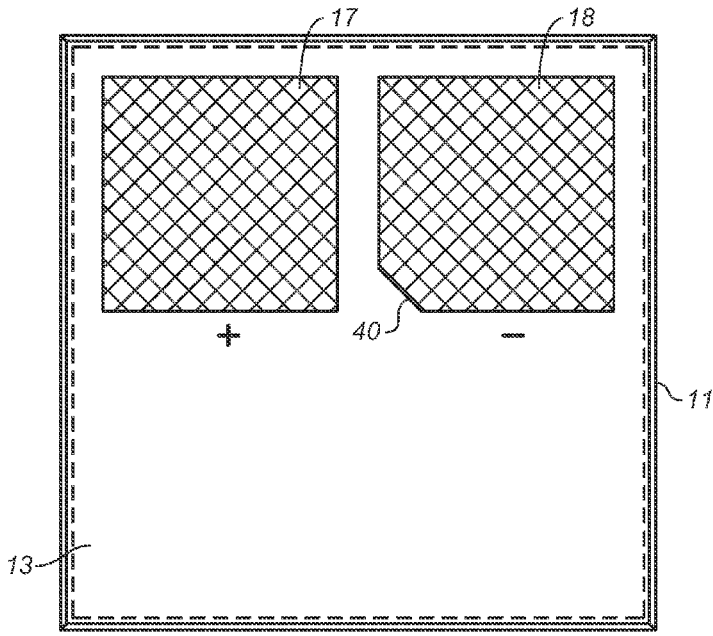
FIG. 8 is a back side plan view of a thin body OLED panel having surface contact electrodes in accordance with the invention.

FIGS. 8-10, 10A and 10B show in greater detail an exemplary OLED panel used in the thin body electrical interconnect system of the invention. FIG. 8 shows the back side 13 of the OLED panel 11 with the positive surface contact electrode 17 and negative electrode 18, both of which are resiliently contacted by the connector circuit of a thin body structure as above-described. For ease in visually distinguishing between the positive and negative electrodes, the negative electrode is provided with a visually prominent angled corner 40. The area of the surface contact electrodes preferably have a relatively large area to ensure contact is made with the electrodes by the connector circuit when thin body parts are engaged. Misalignments in the x-y plane can be accounted for by providing electrodes having a suitably large surface contact area.

Figure 9:
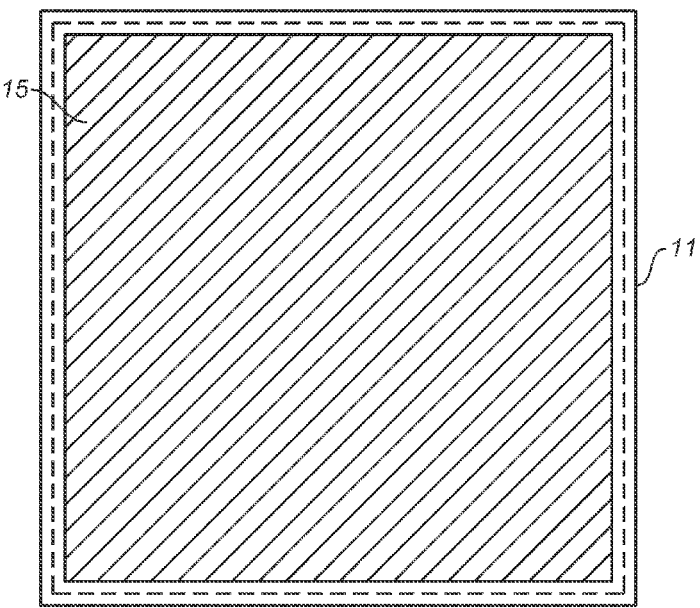
FIG. 9 is front side plan view of the OLED panel shown in FIG. 8.

FIG. 9 shows the light-emitting side of the OLED panel, from which light is produced when electrified. This light-emitting side is opposite the electrodes 17, 18 and does not come into contact with the connector circuit for the OLED panels.

Figure 10:
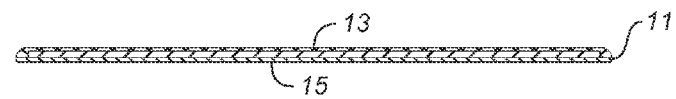
FIG. 10 is cross-sectional view thereof in side elevation.

Referring to FIGS. 10, 10A, and 10B, the planar contact surface electrodes on the back side of the OLED panel 11 are provided on a printed circuit board 43 that extends over the back side of the light-producing OLED 41. The OLED itself is comprised of thin organic electroluminescent layers sandwiched between a glass cover 45 and glass substrate 47. The bottom of the glass substrate can be suitably covered with a light coupling film 49 for improving light transmission through the light-emitting side 15 of the OLED panel.

The printed circuit board that carries the surface contact electrodes 17, 18 provides conductor paths (not shown) between the perimeter electrodes 51 of the OLED 41 and the surface contact electrodes on the back side of the OLED panel. The printed circuit board is seen to extend to and partially wrap around the perimeter of the OLED contained within the OLED panel, where it establishes electrical contact with OLED's perimeter electrodes. Thus, the electrical contacts of the OLED, to which electrical connections to the OLED are made, are enlarged and effectively moved to the back of the OLED panel. As described herein, this OLED electrode configuration permits efficient electrical connections to be readily established between thin body OLED panels on the one hand and surrounding thin body structures on the other hand without wire connectors or the need for wire channels within the surrounding thin body structures.

Figure 12:
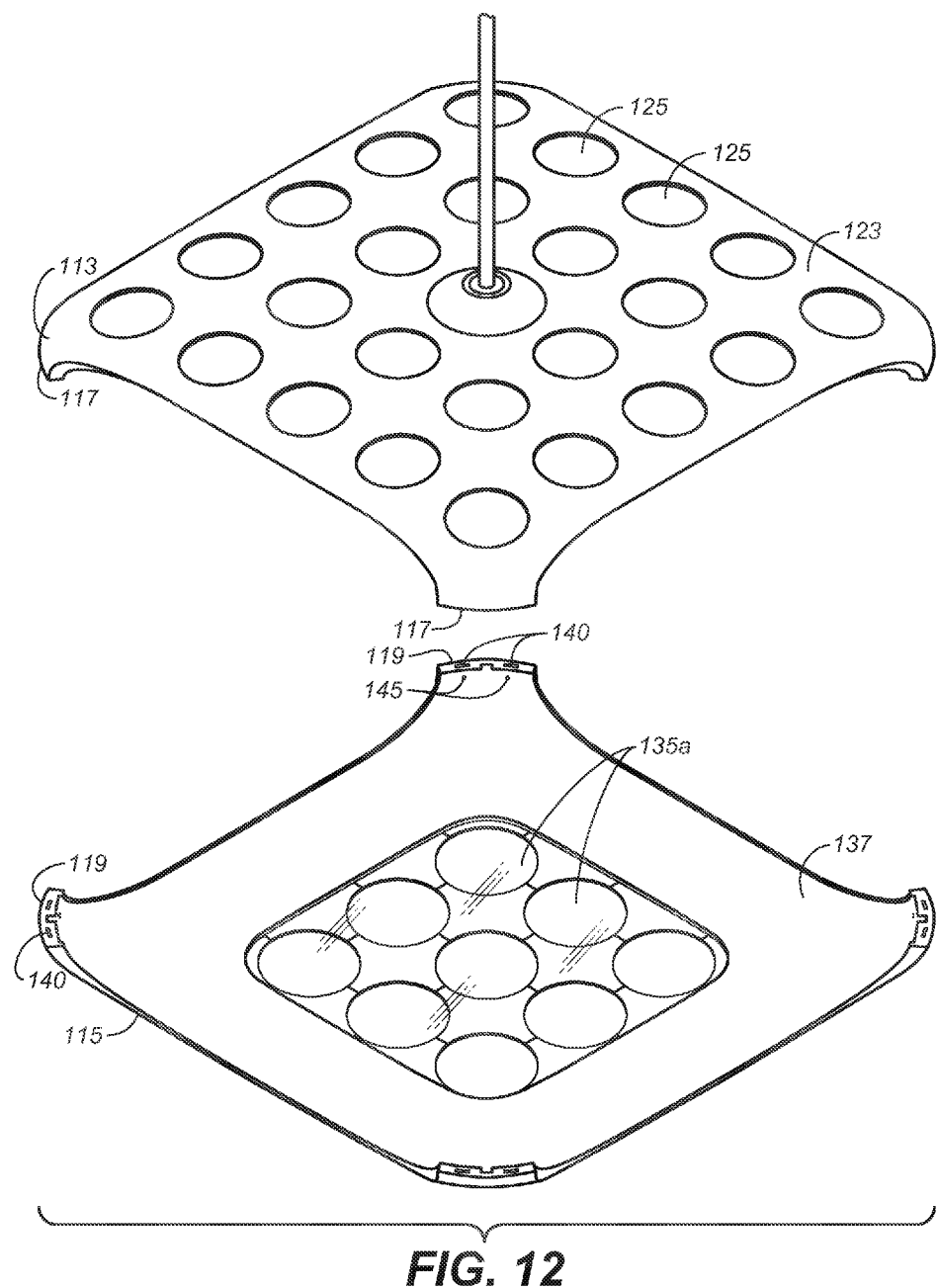
FIG. 12 is a partially exploded perspective view thereof.

FIGS. 11-12 illustrate an example of a luminaire having thin body light sources and thin body support structures capable of supporting an electrical interconnect system in accordance with the invention. Luminaire 111 is seen to have upper and lower thin body clam-shaped sections 113, 115, which are joined together at their interior corner edges 117, 119 to form a pod-shaped thin-walled clam shell housing assembly having an interior cavity 121 and side openings 122. The upper shell section 113 of the luminaire is seen to include an upper clam-shaped shell 123 having a plurality of area light apertures 125, a plurality of thin OLED light panels 127 set into the light apertures 125 suitably on recessed support ledges (not shown) within the apertures, and an upper clam-shaped cover plate 129 securable to the underside of the upper shell 123 for holding the OLED panels in place in the clam shell apertures 125. Similarly, the lower section 115 of the luminaire is seen to include a lower clam-shaped shell 131 having a plurality of area light apertures 133, a plurality of OLED light panels 135 set into the apertures 133 suitably on recessed support ledges (not shown) within the apertures, and a lower clam-shaped thin walled cover plate 137 securable to the inside of the lower shell 31 for holding the OLED panels 135 in place in apertures 133.

In the case of the lower section, the cover plate 137 has a central opening 138 for exposing the center-most apertures 133a (nine in the illustrated embodiment) to the interior cavity 121 of the clamshell assembly. Back-to-back OLED panels 135a are set into these center-most apertures such that light generated by the top one of the back-to-back OLEDs is directed into the interior cavity. The back-to-back OLEDs are covered and held in place by a separate center cover plate 139, which is transparent. The light emitting top surfaces of the back-to-back OLEDs are seen to be tucked down into the lower region of the interior cavity where they are out of the line-of-sight of the observer. It will be understood that "back-to-back OLEDs" as described above can be separate OLED panels placed in a back-to-back relation, or a single OLED panel that emits light from both sides of the panel.

The upper and lower thin walled shells 123, 131 and the upper and lower thin walled cover plates 129, 137 of upper and lower shell sections 113, 115 of the shell housing can suitably be fabricated of a plastic material such as acrylonitrile butadiene styrene (ABS). The center cover plate 139 for covering the upwardly facing OLEDs in the cover opening 139 in the lower shell section can suitably be fabricated of clear acrylic plastic or PVC plastic.

Figure 13:
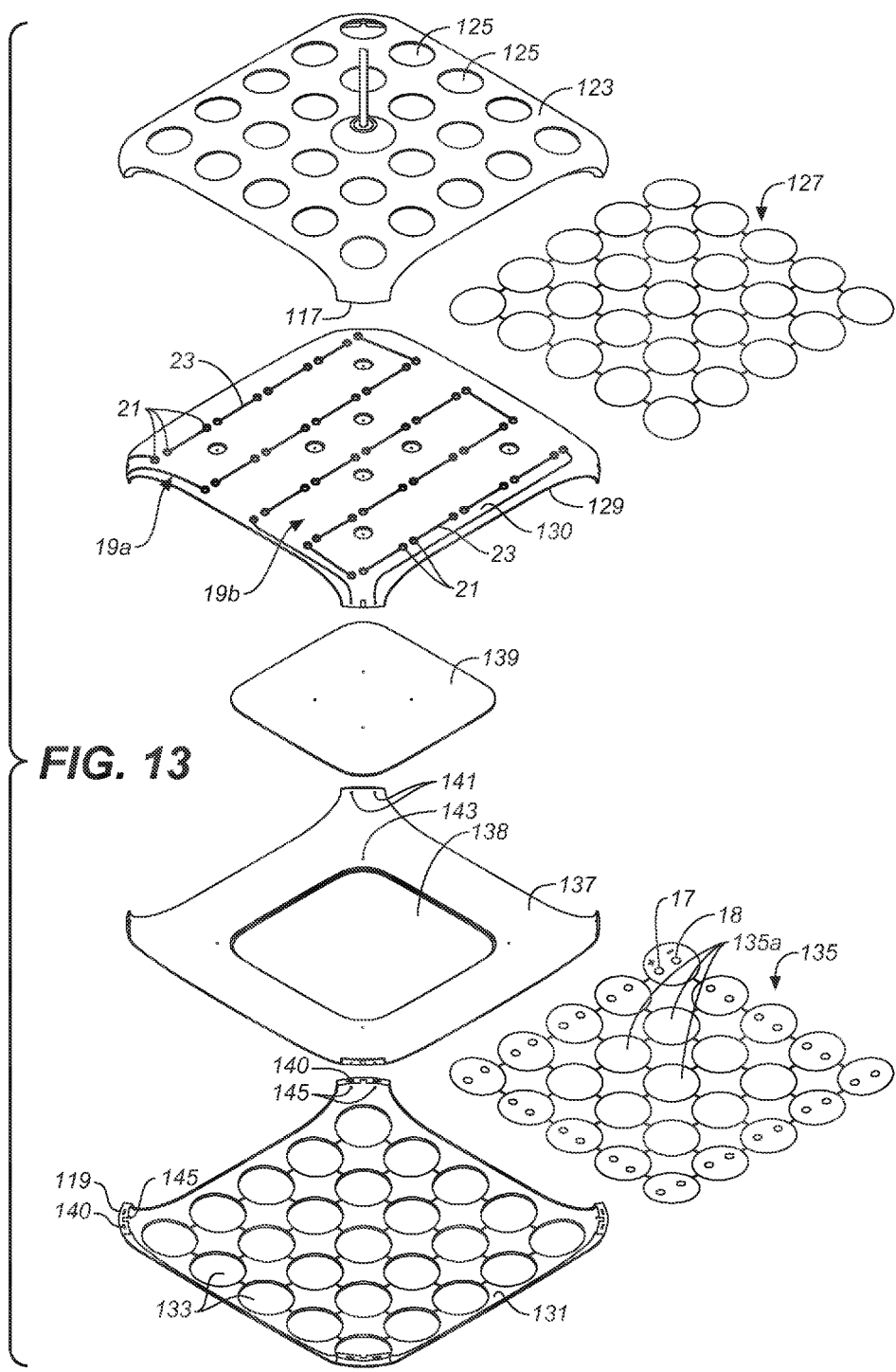
FIG. 13 is a completely fully exploded view thereof.

The luminaire 111 can be provided with an with an electrical interconnect system in accordance with the invention for electrifying all of the OLED panels 125, 135 held in the within the luminaire's upper and lower thin body clam-shaped sections 113, 115, except for the uncovered back-to-back OLED panels 135a. The back side of each of the OLED panels (except for OLED panels 135a) can be provided with side-by-side positive and negative surface contact electrodes, such as the surface contact electrodes 17, 18 shown on the back side of the covered perimeter OLED panels in the lower thin body clam-shaped section 115. (The back sides of the OLED panels 125 have similar surface contact electrodes but are not seen.) The connector circuits for the covered OLED panels in each clam shell section is provided on the side of the clam shell section's cover plates 129, 137 that faces the back side of the OLED panels. As shown in FIG. 13 and particularly on the top side 130 of upper cover plate 129, separate series connected connector circuits 19a, 19b can be provided, each of which can be connected to a separate driver (not shown). The number of connector circuits used will depend on the drivers used and the number of OLED panels that can be powered to a desired light output by the selected drivers.

Each of the connector circuits, such as connector circuits 19a, 19b seen on cover plate 129 in FIG. 13, is comprised of a series of surface contact terminals 21 and conductor traces 23 applied to and conforming to the shape of the cover plates 129, 137. Surface contact terminals 21 are positioned on the cover plates in correspondence with the positive and negative surface contact electrodes of the covered OLED panels 127, 135. Resilient contacts can be provided at the contact terminals 21, such as by interposing resilient conductor pads, such as conductor pads 25 shown in FIGS. 1-3, between the OLED electrodes and the contact terminals 21. (Resilient conductor pads are not shown in FIG. 13.) When the cover plates 129, 137 are fastened to their respective shells 123, 131, the contact terminals 21 of connector circuits will overlie and engage with the back sides of the opposed OLED panels electrical, making contact with the OLED panels' surface electrodes 17, 18. By providing surface electrodes of a suitably large size as earlier described, contact failures due to small mis-alignments can be avoided.

The lower shell section 115 can be electrically connected to the upper shell section through electrical connections at one or more of the corner edges 117, 119 of upper and lower shells 123, 131. Suitably the shells 123, 131 are thicker than the inner cover plates 129, 137; for example the shells could be in the range of ⅜ inch thick and the cover plates in the range of ⅛ inch thick. Quick connectors can be provided in the shell corner edges 117, 119 to establish an electrical connection when the shells are joined together.

To assemble the luminaire 111, the OLED panels can first be installed in the upper and lower shells shell sections 113, 115, and the cover plates 129, 131 secured to the underside of the shells by suitable means, such as by screw attachments. Screw holes, such as holes denoted 143 on the lower cover plate 137, can be provided in the cover plates and the shells for this purpose. (The covers could alternatively be sized to press fit into the curved undersides of the shells.) Fastening of the cover palates in place will cause the covered OLED's to make electrical connection to the connector circuits on the cover plates.

The interior edges of the shells can then be joined together by any suitable means. For example, dowel pins such as oblong aluminum dowel pins can be inserted in correspondingly shaped dowel holes 140 in the corner edges 119 of the shell 131 of the lower shell section 115 so that they project up from these corner edges. The corner edges of the upper shell section can be provided with corresponding dowel holes that fit down over the projecting dowel pins in the lower shell when the corner edges of the two halves of the shell housing are fitted together. The edges can then be locked in place by set screws, which screw into set screw holes 141, 145 on the interior corners on the cover plates and shells. The set screws, which can be inserted by reaching through the side openings 122 of the shell housing, are screwed into the dowel pins.

While the present invention has been described in considerable detail in the foregoing specification and the accompanying drawings, it is not intended that the invention be limited to such detail except as expressly stated herein.

We claim:

1. An electrical interconnect system for thin body structures having at least one thin body light source to be electrified, wherein said thin body light source includes a front side for emitting light, a back side, and surface contact electrodes on said back side, said electrical interconnect system comprising:
    a connector circuit supportable by a thin body support structure for making desired electrical connections with the surface contact electrodes of said thin body light source when the thin body light source and thin body connector circuit support structure are brought into engagement with each other, wherein said connector circuit is a flexible circuit that conforms to the shape of the thin body connector circuit support structure, and
    resilient electrical contact means for establishing a physical resilient electrical contact between said connector circuit and the surface contact electrodes of said thin body light source when the thin body light source is engaged with said connector circuit.

2. The electrical interconnect system of claim 1 wherein said resilient electrical contact means is comprised of resilient conductor pads interposed between the surface contact electrodes on the back side of the thin body light source and the connector circuit supported on said thin body structure.

3. The electrical interconnect system of claim 1 wherein said connector circuit is configured to electrically connect the connector circuit and the thin body light source via the surface contact electrodes of the thin body light source when the thin body structure supporting the connector circuit overlies the back side of the thin body light source.

4. The electrical interconnect system of claim 1 wherein there are a plurality of thin body light sources to be electrified, each having a front side for emitting light, a back side, and surface contact electrodes on their back side, and wherein the connector circuit supportable by a thin body support structure is configured for making electrical connections with the surface contact electrodes of each of said thin body light sources when the thin body light sources and thin body connector circuit support structure are brought into engagement with each other.

5. The electrical interconnect system of claim 4 wherein said connector circuit is comprised of surface contact terminals and conductor traces connecting selected ones of said surface contact terminals, and wherein the surface contact terminals of said connector circuit are positioned on the thin body structure in correspondence with the surface contact electrodes of the thin body light sources in accordance with a predetermined circuit configuration for electrifying the thin body light sources when the thin body light sources and thin body connector circuit support structure are brought into engagement with each other, 6. The electrical interconnect system of claim 1 wherein the surface contact electrodes of the thin body light source each has a relatively large surface area in relation to the surface area of the back side of the thin body light source.

7. An electrical interconnect system for thin body structures having at least one thin body light source to be electrified, wherein said thin body light source includes a front side for emitting light, a back side, and surface contact electrodes on said back side, said electrical interconnect system comprising:
    a connector circuit supportable by a thin body support structure for making desired electrical connections with the surface contact electrodes of said thin body light source when the thin body light source and thin body connector circuit support structure are brought into engagement with each other, and
    resilient spring contacts for establishing a resilient electrical contact between said connector circuit and the surface contact electrodes of said thin body light source when the thin body light source is engaged with said connector circuit.

8. The electrical interconnect system of claim 7 wherein said connector circuit is a flexible circuit that conforms to the shape of the thin body connector circuit support structure.

9. The electrical interconnect system of claim 7 wherein said connector circuit is configured to electrically connect the connector circuit and the thin body light source via the surface contact electrodes of the thin body light source when the thin body structure supporting the connector circuit overlies the back side of the thin body light source.

10. An electrical interconnect system for thin body structures having a plurality of thin body light sources to be electrified, wherein each of said thin body light sources include a front side for emitting light, a back side, and surface contact electrodes on said back side, said electrical interconnect system comprising:
    a flexible connector circuit that is supportable by and that conforms to the shape of a thin body support structure for making desired electrical connections with the surface contact electrodes of said thin body light sources when the thin body light sources and thin body connector circuit support structure are brought into engagement with each other, and resilient electrical contact means for establishing a resilient electrical contact between said connector circuit and the surface contact electrodes of each of said thin body light sources when the thin body light sources are engaged with said connector circuit.

11. A luminaire comprising:

a thin body structure, a thin body light source adapted to be engaged by said thin body structure, said thin body light source having a front side for emitting light from said thin body structure, a back side, and surface contact electrodes on said back side, an electrical interconnect system for electrifying the thin body light source, said electrical interconnect system comprising, a connector circuit supported by a thin body structure for making desired electrical connections with the surface contact electrodes of said thin body light source when the thin body light source and thin body connector circuit support structure are brought into engagement with each other, and resilient electrical contact means for establishing a physical resilient electrical contact between said connector circuit and the surface contact electrodes of said thin body light source when the thin body light source is engaged with said connector circuit, wherein said resilient electrical contact means are comprised of resilient spring contacts.

12. The electrical interconnect system of claim 11 wherein the thin body structure supporting the connector circuit overlies the back side of the thin body light source when the thin body light source is engaged with said connector circuit, such that the connector circuit electrically connects the connector circuit and the thin body light source via the surface contact electrodes of the thin body light source.

13. The electrical interconnect system of claim 11 wherein a plurality of thin body light sources to be electrified are provided on said thin body structure, each of said thin body light sources has a front side for emitting light, a back side, and surface contact electrodes on its back side, and the connector circuit supportable by a thin body support structure is configured for making electrical connections with the surface contact electrodes of each of said thin body light sources when the thin body light sources and thin body connector circuit support structure are brought into engagement with each other.

14. A luminaire comprising:

a shell housing having a shape, a plurality of thin body light sources supported by said shell housing, said thin body light sources having a front side for emitting light from said thin body structure, a back side, and surface contact electrodes on said back side, a thin body structure attachable to said shell housing so as to overlie the back side of said thin body light sources, said thin body structure conforming to the shape to the shell housing, an electrical interconnect system for electrifying the thin body light sources supported by said shell housing, said electrical interconnect system comprising, a connector circuit supported by and conforming to the shape of said thin body structure for making desired electrical connections with the surface contact electrodes of said thin body light sources when the thin body structure is attached to the shell housing, and resilient electrical contact means for establishing a physical resilient electrical contact between said connector circuit and the surface contact electrodes of said thin body light source when the thin body structure is attached to the she housing, wherein said resilient electrical contact means are comprised of resilient spring contacts.

15. The electrical interconnect system of claim 14 wherein the thin body structure supporting the connector circuit overlies the back side of the thin body light source when the thin body light source is engaged with said connector circuit, such that the connector circuit electrically connects the connector circuit and the thin body light source via the surface contact electrodes of the thin body light source.

* * * * *